INVENTOR.
JOHN G. SCHWEIGERT

May 2, 1961  J. G. SCHWEIGERT  2,982,037
DISPLAY DEVICE
Filed Aug. 14, 1959  2 Sheets-Sheet 2
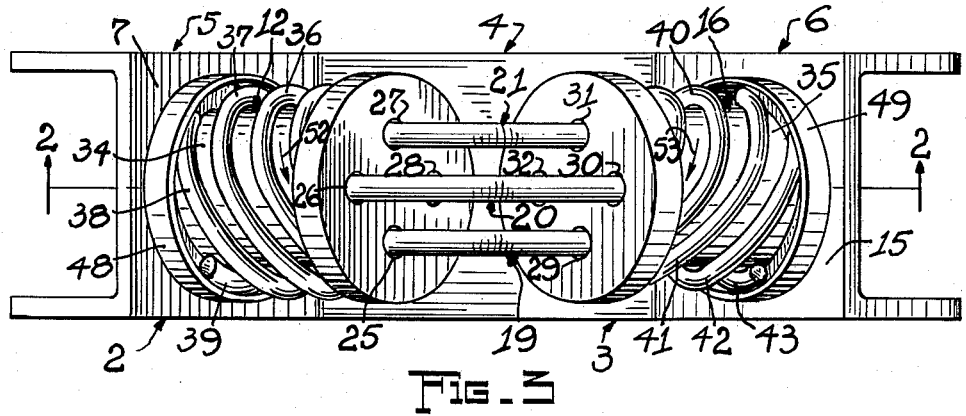
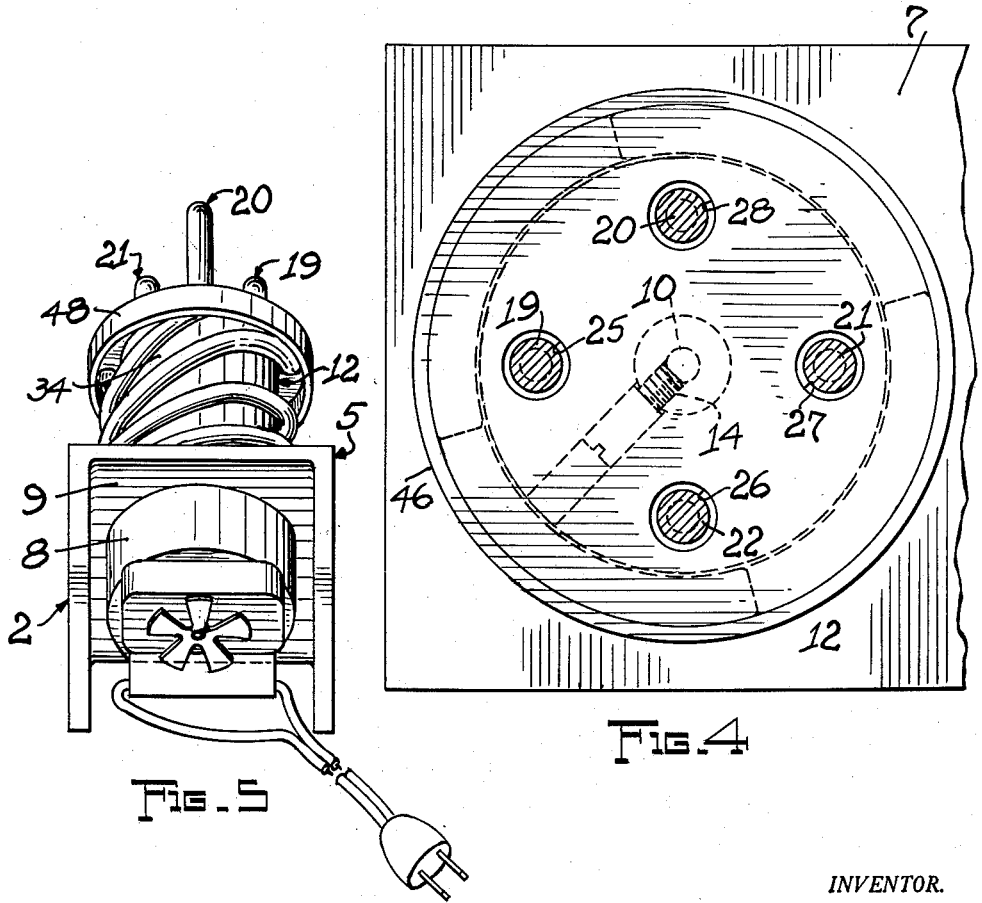
INVENTOR.
JOHN G. SCHWEIGERT
BY
ATT.

United States Patent Office

2,982,037
Patented May 2, 1961

2,982,037

DISPLAY DEVICE

John G. Schweigert, 4929 E. 106th St., Cleveland, Ohio, assignor of one-half to Robert Berning, Garfield, Ohio Filed Aug. 14, 1959, Ser. No. 833,855

2 Claims. (Cl. 40—33)

This invention relates in general to display devices and, more particularly, to animated display devices adapted to attract the attention of the public to exhibits, signs, special merchandise, etc.

The primary object of this invention is the provision of a display device including cooperating rotatory members of special design arranged in inclined position with respect to each other to effect by joint rotation not readily explainable optical impressions and sensuous images.

Another object of the invention is the provision of a display device including cooperating, rotatory, angularly related members coupled with each other for rotation in opposite directions, the rotatory members embodying spiral-like means and effecting by their rotation sensuous images of shifting the spiral-like means on the rotary members.

A further object of the invention is the provision of a display device including angularly related, rotatory, cylindrically shaped members coupled with each other for rotation in opposite directions at identical rotary speeds, the rotary members including marked strip-like means spirally arranged on the peripheral surfaces of the cylindrical members to effect by their rotation sensuous images indicating a shifting of the strip-like means on the peripheral surfaces of the rotary members.

Still another object of the invention is the provision of a display device including a base, coupled, cylindrically shaped members, angularly arranged and rotatably mounted on the base in symmetrical relation with respect thereto, and marked strip-like means spirally arranged on the peripheral surfaces of the cylindrically shaped members to effect by rotation sensuous images indicating shifting of the strip-like means on the peripheral surfaces of the cylindrically shaped members.

Further objects of the invention lie in the provision of a display device of the type referred to above in which the strip-like means are formed by elongated marked members of different designs spirally wound on the peripheral surfaces of the cylindrically shaped members in which the cylindrically shaped members are coupled with each other by angularly bent, marked crankshafts of designs matching the elongated marked strip-like members, and in which the cylindrically shaped members include eccentrically arranged parallel bores freely slidably supporting the arms of the angularly bent, marked crankshafts.

With the above and other objects in view, the invention has certain other marked superiorities which clearly distinguish it from presently known structures and devices of this type. These improvements or characteristics, embodying certain novel features of construction and design are clearly set forth in the appended claims, and a preferred form of embodiment of the invention is hereinafter shown with reference to the accompanying drawings forming part of the specification.

In the drawings:

Fig. 3 is plan view of Fig. 1.

Fig. 4 is an enlarged cross sectional view taken on line 4—4 of Fig. 1, and

Fig. 5 is an end view taken from line 5—5 of Fig. 1.

Figure 1:
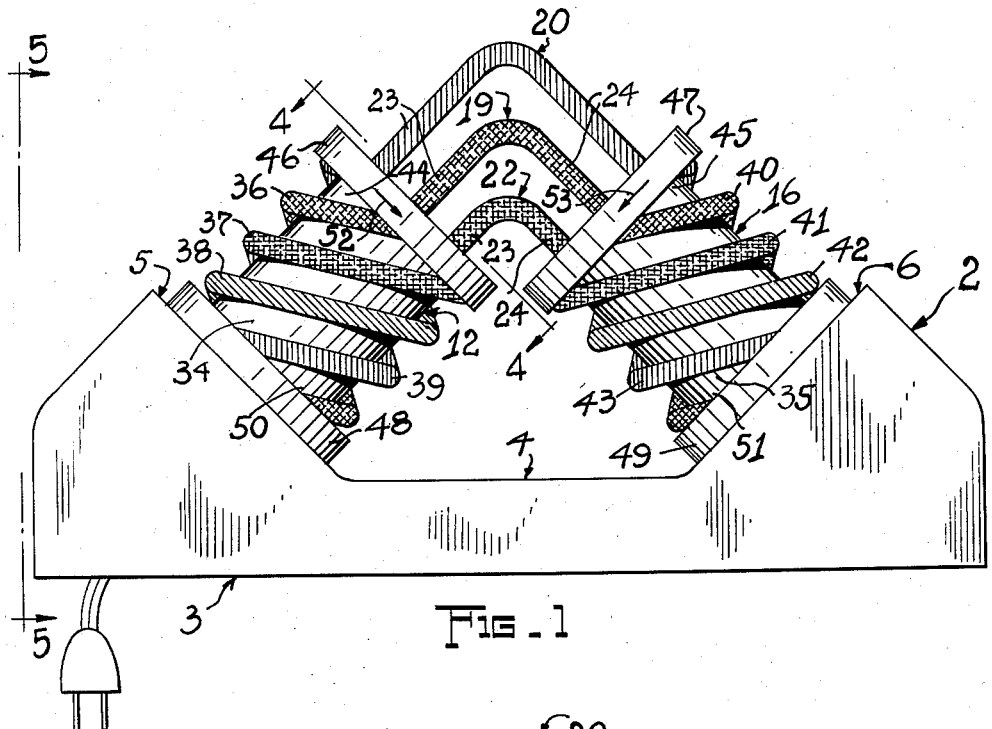
Fig. 1 is a side view of a display device according to the invention.
Figure 2:
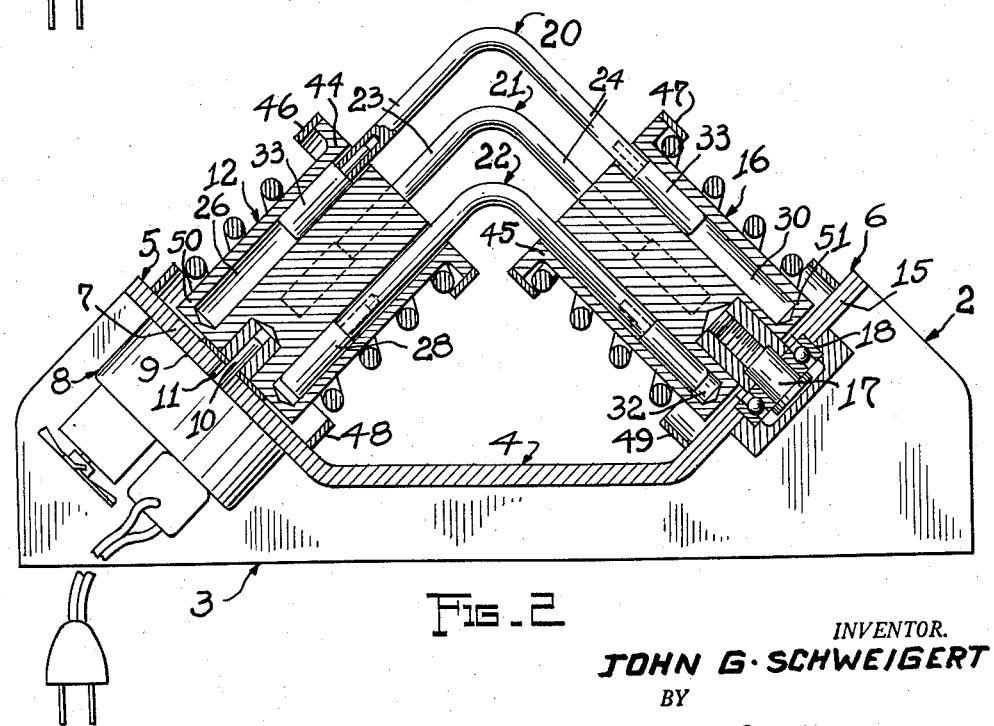
Fig. 2 is a longitudinal sectional view partly in elevation taken on line 2—2 of Fig. 3.

Referring now to the exemplified form of the invention shown in the drawing, reference numeral 2 denotes a display device having a base 3 of U-shaped cross section which base includes a middle portion 4 and two symmetrically arranged inclined end portions 5 and 6 related at a right angle with respect to each other. End portion 5 supports on inclined wall 7 an electric motor 8 abutting bottom face 9 of wall 7, which motor is secured thereto in any suitable manner which includes a motor shaft 10 extended upwardly through central bore 11 in wall 7, which shaft 10 is coupled with a cylindrical member 12 by screw 14 (Fig. 4). End portion 6 rotatably supports on inclined wall 15 a second cylindrical member 16 which has extended therefrom a stud shaft 17 rotatably mounted in ball bearing 18 in inclined wall 15.

The cylindrical members 12 and 16 are symmetrically arranged with respect to each other, inclined toward each other and directly coupled with each other by angular crankshafts 19, 20, 21, 22 each of which embodies two rectangularly related arms 23, 24. These crankshafts have their angularly related arms 23 and 24 freely slidably extended in bores 25, 26, 27, 28 of cylindrical member 12 and bores 29, 30, 31, 32 of cylindrical member 16. The bores 25, 26, 27, 28 are symmetrically arranged to each other and to the longitudinal axis of cylindrical member 12 and are arranged parallel with respect thereto and the bores 29, 30, 31, 32 are symmetrically arranged with respect to each other and the longitudinal axis of cylindrical member 16 and are parallel with respect thereto. Crankshafts 19, 20, 21, 22 have slightly less diameter than the diameters of the bores and each of the crankshafts includes at the ends of its arms 23, 24 piston-like extensions 33 fitting the bores, the extensions being rigidly secured to arms 23, 24.

Cylindrical members 12 and 16 support on their peripheral surfaces 34, 35 four individual members 36, 37, 38, 39 and 40, 41, 42, 43 respectively which spiral members have a pitch to position spiral members 37, 38 between spiral members 36, 39 and spiral members 41, 42 between spiral members 40, 43. All spiral members on cylindrical members 12 and 16 are marked and corresponding spiral members on cylindrical bodies 12 and 16 have the same markings or colors as the case may be. In addition all spiral members are arranged to visually associate their upper end portions with angular crankshafts 19, 20, 21, 22, which are marked or colored accordingly to create the impression that, for example, spiral member 36, crankshaft 19 and spiral member 40 form one structure, spiral member 37, crankshaft 20 and spiral member 41 form another structure, etc. The upper portions 44, 45 of cylindrical members 12 and 16 carry collar members 46, 47 and the inclined walls 7 and 15 carry collar members 48, 49 to hide upper and lower end portions 44, 50 and 45, 51 of cylindrical members 12 and 16 and the upper and lower end portions of the respective spiral members.

Cylindrical member 12 is axially rotated by electric motor 8 in the direction of arrow 52 and cylindrical member 16 coupled with cylindrical member 12 by crankshafts 19, 20, 21 and 22 is axially rotated in the opposite direction as indicated by arrow 53, so that spiral members 36, 37, 38, and 39 and spiral members 40, 41, 42, and 43 appear to travel on peripheral surfaces 34, 35 of the respective cylindrical members 12 and 16 in an upward direction and hence into the respective crankshafts 19, 20, 21, and 22 to create a visible and sensuous image not immediate in perception and therefore attractive to the public.

Obviously rotation of cylindrical members 12 and 16 in directions opposite to the rotary movements indicated by arrows 52 and 53, will effect a visible and sensuous image different from the visible and sensuous image previously described. In this case spiral members 36, 37, 38 and 39 and spiral members 40, 41, 42 and 43 will appear to travel on peripheral members 12 and 16 in a downward direction.

It should be understood that dimensions of either one of the cylindrical members 12 and 16, the angular relationship of these members, and the angle of the crankshafts may be chosen to attain any desired visible and sensuous image.

While there has been shown and described a particular embodiment of this invention it will be obvious to those skilled in the art that various changes and modifications may be made therein without departing from the invention and, therefore, it is intended in the appended claims to cover all such changes and modifications as fall within the true spirit and scope of the invention.

Having thus described my invention, what I claim is:

1. In a display device having a base, a plurality of cylinders mounted for rotation on said base with their axes of rotation angularly disposed to each other, coupling means for transmitting rotatory motion from one cylinder to another cylinder including crankshaft means having the ends disposed at an angle to each other corresponding to the angular disposition of said cylinder axes, axially disposed apertured means in each cylinder spaced radially from the axis thereof and receiving the said crankshaft ends respectively for relative axial movement therein, a plurality of structural elements corresponding in number to the number of crankshafts spirally encircling each of said cylinders, the ends of said elements adjacent said coupling means being disposed on substantially the same radius of said apertured means receiving the end of the respectively corresponding crankshaft for visual moving coaction with the crankshaft received therein.

2. In a display device having a base, a plurality of cylinders mounted for rotation on said base with their axes of rotation angularly disposed to each other, coupling means for transmitting rotatory motion from one cylinder to another cylinder including crankshaft means having the ends disposed at an angle to each other corresponding to the angular disposition of said cylinder axes and having distinctive markings thereon, axially disposed apertured means in each cylinder spaced radially from the axis thereof and receiving the said crankshaft ends respectively for relative axial movement therein, a plurality of distinctively marked structural elements corresponding in number to the number of crankshafts, spirally encircling each of said cylinders the ends thereof adjacent said coupling means being disposed on substantially the same radius as said apertured means receiving the end of the respectively corresponding crankshaft to provide visually distinctive markings corresponding to the distinctive markings on said crankshaft means for visual moving coaction therewith.

References Cited in the file of this patent

UNITED STATES PATENTS

| | | |
|---|---|---|
| 1,315,680 | Nordbred | Sept. 9, 1919 |
| 2,218,303 | Smith | Oct. 15, 1940 |
| 2,543,134 | Smith et al. | Feb. 27, 1951 |
| 2,811,025 | Redard | Oct. 29, 1957 |

FOREIGN PATENTS

| | | |
|---|---|---|
| 574,253 | France | July 9, 1924 |